United States Patent
Killing et al.

(10) Patent No.: US 10,633,052 B2
(45) Date of Patent: Apr. 28, 2020

(54) ADJUSTABLE AEROBAR RISER ASSEMBLY FOR A BICYCLE

(71) Applicant: VROOMEN-WHITE DESIGN INC., Toronto (CA)

(72) Inventors: David Killing, Scarborough (CA); Kevin Nelson, Salt Lake City, UT (US)

(73) Assignee: VROOMEN-WHITE DESIGN INC. (CA)

( * ) Notice: Subject to any disclaimer, the term of this patent is extended or adjusted under 35 U.S.C. 154(b) by 0 days.

(21) Appl. No.: 16/336,859

(22) PCT Filed: Sep. 26, 2017

(86) PCT No.: PCT/CA2017/051133
§ 371 (c)(1),
(2) Date: Mar. 26, 2019

(87) PCT Pub. No.: WO2018/053652
PCT Pub. Date: Mar. 29, 2018

(65) Prior Publication Data
US 2019/0359280 A1    Nov. 28, 2019

Related U.S. Application Data

(60) Provisional application No. 62/399,890, filed on Sep. 26, 2016.

(51) Int. Cl.
*B62K 21/22* (2006.01)
*B62K 19/32* (2006.01)
(Continued)

(52) U.S. Cl.
CPC .............. *B62K 21/22* (2013.01); *B62K 19/32* (2013.01); *B62K 21/125* (2013.01); *B62K 21/16* (2013.01)

(58) Field of Classification Search
CPC ...... B62K 21/16; B62K 21/125; B62K 21/32; B62K 21/30; B62K 19/32; B62K 19/30;
(Continued)

(56) References Cited

U.S. PATENT DOCUMENTS

| 5,331,865 | A | * | 7/1994 | Oskam | B62K 21/16 |
| | | | | | 74/551.3 |
| 5,509,328 | A | * | 4/1996 | Lai | B62K 21/16 |
| | | | | | 280/279 |

(Continued)

FOREIGN PATENT DOCUMENTS

| CN | 203222091 U | 10/2013 |
| WO | 95/25034 A1 | 9/1995 |

OTHER PUBLICATIONS

Canadian Intellectual Property Office, International Search Report and Written Opinion of the International Searching Authority, in PCT/CA2017/051133, dated Jan. 9, 2018, which is the international application to this U.S. application.

(Continued)

*Primary Examiner* — Patrick Cicchino
(74) *Attorney, Agent, or Firm* — Kolitch Romano LLP

(57) ABSTRACT

An adjustable riser assembly for mounting a handle bar assembly on a bicycle comprising a riser post; a tilt adjustment plate; the riser post including a curved mounting surface for receiving the tilt adjustment plate and the curved mounting surface being configured to support the tilt adjustment plate in a range of adjustable angular positions; and a bolt fastener for securing the tilt adjustment to the riser post in an angular position or a horizontal position.

16 Claims, 5 Drawing Sheets

(51) Int. Cl.
*B62K 21/12* (2006.01)
*B62K 21/16* (2006.01)

(58) Field of Classification Search
CPC ............... B62K 21/22; Y10T 74/20792; Y10T 74/20822
See application file for complete search history.

(56) References Cited

U.S. PATENT DOCUMENTS

| | | | |
|---|---|---|---|
| 5,842,385 A | 12/1998 | Su | |
| 6,244,131 B1 * | 6/2001 | Liao | B62K 21/12 74/551.1 |
| 7,698,967 B2 * | 4/2010 | Ording | B62K 21/125 74/551.8 |
| 7,699,332 B2 * | 4/2010 | Lai | B62K 21/16 280/279 |
| 8,307,736 B2 | 11/2012 | Lin | |
| 8,308,179 B2 * | 11/2012 | Cote | B62K 19/30 280/288.3 |
| 8,578,814 B2 * | 11/2013 | Servet | B62K 21/16 74/551.3 |
| 8,661,935 B2 * | 3/2014 | Cote | B62K 21/125 74/551.3 |
| 8,925,949 B2 | 1/2015 | Zecchetto | |
| 10,046,825 B1 * | 8/2018 | Chen | B62K 21/24 |
| 10,160,510 B1 * | 12/2018 | Salazar | B62K 21/12 |
| 10,351,205 B2 * | 7/2019 | Yu | F16F 1/376 |
| 2006/0099027 A1 * | 5/2006 | Liao | B62K 21/12 403/322.4 |
| 2006/0177260 A1 | 8/2006 | Liao | |
| 2009/0078076 A1 * | 3/2009 | Chen | B62K 21/16 74/551.8 |
| 2013/0319169 A1 * | 12/2013 | Savard | B62H 5/06 74/551.8 |
| 2017/0217535 A1 * | 8/2017 | Felker | B62M 1/26 |

OTHER PUBLICATIONS

Krysta Longridge, "How to Choose the Right Stem", article, published Mar. 2, 2016, online at livetoplaysports.com, retrieved at https://livetoplaysports.com/news-press/2016/03/how-to-choose-the-right-stem/.

* cited by examiner

ADJUSTABLE AEROBAR RISER ASSEMBLY FOR A BICYCLE

FIELD OF THE INVENTION

The present invention relates to bicycles and more particularly, to an adjustable aerobar riser assembly for a bicycle.

BACKGROUND OF THE INVENTION

In the art, aerodynamically designed bicycles are common place at triathlon events. Triathlons continue to remain popular and the majority of participants are non-professional athletes, commonly referred to as age groupers. Age groupers represent a cross section of the population. To fully benefit from the aero advantages of today's aero bikes, a proper fit for the rider is crucial. Therefore, the adjustability of the bicycle components to achieve the proper fit can become critical.

Accordingly, there remains a need for improvements in the art.

BRIEF SUMMARY OF THE INVENTION

The present invention is directed to an adjustable aerobar riser assembly suitable for use with an aerodynamic bicycle or aero bike.

According to one aspect, the present invention comprises an adjustable riser assembly for mounting a handle bar assembly on a bicycle comprising a riser post; a tilt adjustment plate; the riser post including a curved mounting surface for receiving the tilt adjustment plate and the curved mounting surface being configured to support the tilt adjustment plate through a range of adjustable positions; and a fastener for securing the tilt adjustment plate to the riser post in an angular or a horizontal position.

According to another aspect, the present invention comprises a bicycle frame comprising: a fork assembly; a bottom bracket; a top tube, a head tube, and a down tube; one end of the top tube and one end of the down tube being affixed to the head tube, and another end of the top tube being affixed to a seat tube; first and second chain stays, and one end of each of the chain stays being affixed to the bottom bracket; the fork assembly being operatively coupled to said head tube; an adjustable riser assembly configured for receiving an extension bar assembly; the adjustable riser assembly comprising, a riser post, the riser post being operatively coupled to the fork assembly; a tilt adjustment plate; the riser post including a curved mounting surface for receiving the tilt adjustment plate and the curved mounting surface being configured to support the tilt adjustment plate through a range of angular positions; and one or more fasteners for securing the tilt adjustment plate to the riser post in an angular position or a substantially horizontal position.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which.

Like reference numerals indicate like or corresponding elements or components in the drawings.

DETAILED DESCRIPTION OF THE EMBODIMENTS OF THE INVENTION

Figure 1:
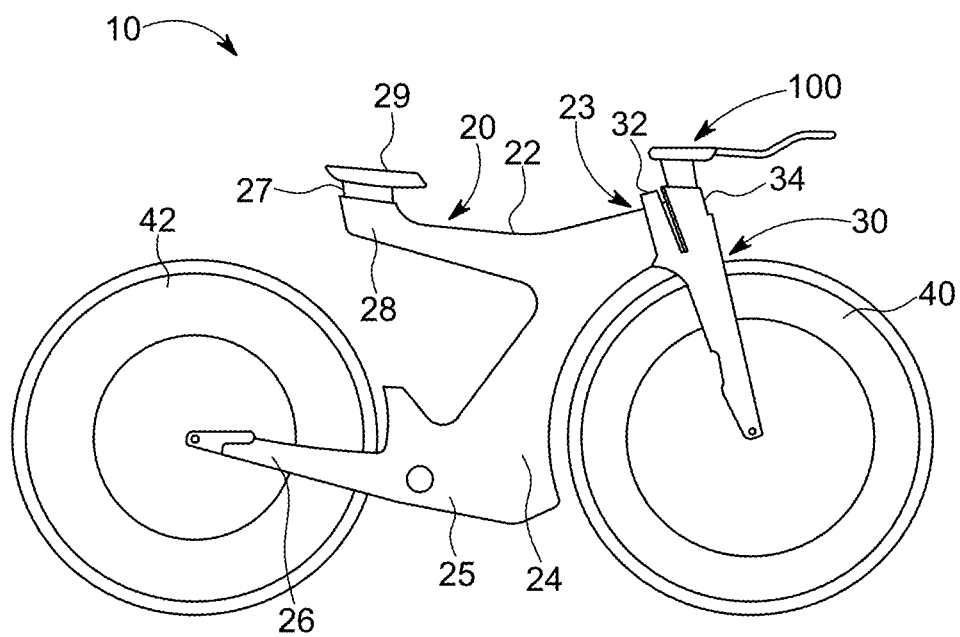
FIG. 1 shows in diagrammatic form an aerodynamic bicycle with an adjustable riser assembly according to an embodiment of the present invention.

Reference is first made to FIG. 1, which shows in diagrammatic form an aerodynamic bicycle, i.e. an aero bike, with an adjustable riser assembly according to an embodiment of the present invention. The aerodynamic bicycle is indicated generally by reference 10 and the adjustable riser assembly is indicated generally by reference 100. While the adjustable riser assembly is described in the context of aero bike, it will be appreciated that the adjustable riser assembly is applicable and adaptable to other bike configurations or geometries.

As shown in FIG. 1, the aero bike 10 comprises a frame 20, a fork assembly and front 40 and rear 42 wheels. According to an exemplary embodiment, the frame 20 comprises a "beam configuration" as will be understood by those skilled in the art. The frameset or frame 20 comprises a top tube 22, a bottom tube 24, a bottom bracket 25, chain stays 26 (only the right chain stay being shown in FIG. 1) and a fork assembly 30. According to an exemplary embodiment, the frame 20 comprises an external steerer configuration with a head tube 32 for coupling the fork assembly 30 to the frame 20, and separate steerer tube 34 in the fork assembly for mounting a handlebar assembly, e.g. aerobar assembly, indicated generally by reference 36. As shown in FIG. 1, the top tube 22 includes a seat post section 28 and adjustable seat post 27 for mounting a saddle indicated by reference 29. According to another aspect, the front 40 and 42 wheels comprise aerodynamic wheels with a deep flange or full disc configuration. The specific implementation and/ or assembly details and additional components required for setting up the bicycle 10 and the frameset 20 will be readily apparent to those skilled in the art.

According to an embodiment of the present invention, the bicycle 10, i.e. aero bike, includes an adjustable riser assembly 100, which as will be described in more detail below provides the capability to adjust the height, and/or angle or tilt, of the handlebar assembly 36, i.e. an extension bar assembly configured for riding the bicycle in an aerodynamic rider position, i.e. riding in "aero".

Figure 2:
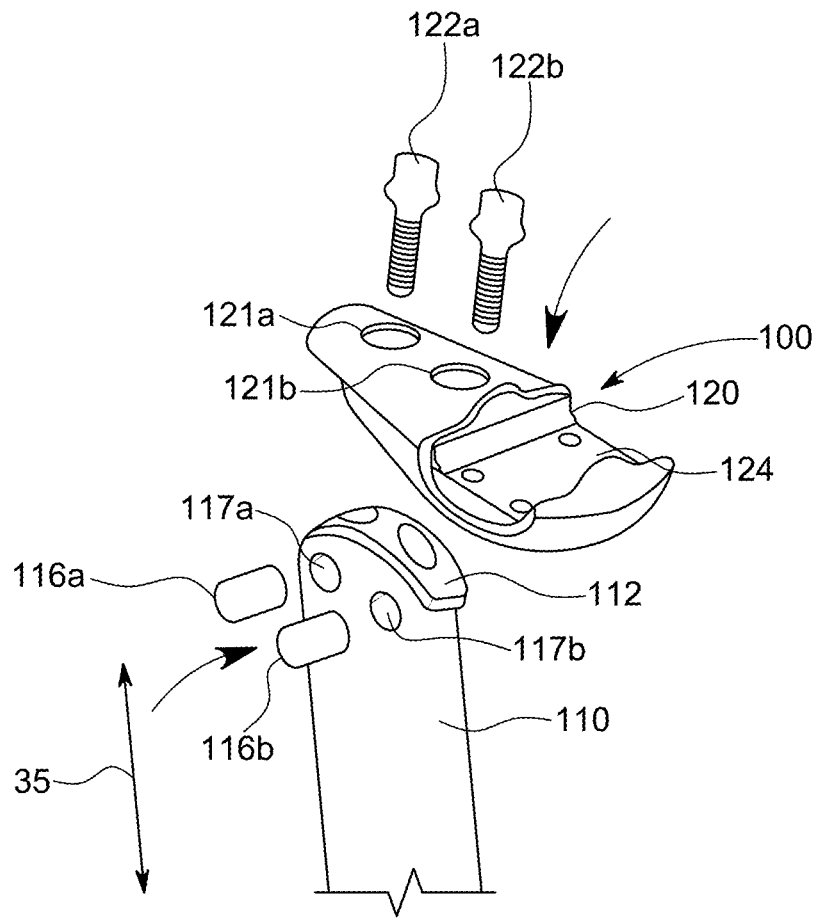
FIG. 2 is an exploded view of the adjustable riser assembly of FIG. 1 according to an embodiment of the present invention.

As shown in FIG. 2, the adjustable riser assembly 100 comprises a riser post 110 and a tilt adjustment plate indicated generally by reference 120. The riser post 110 is configured to mount inside the steerer tube or assembly 34 and adjustable in height, up and down, as indicated by arrow 35, for raising or lowering the position of the handlebar assembly 36 on the bicycle 10 as shown in FIG. 1. The adjustable riser assembly 100 is configured to pivot or tilt the attached handlebar assembly 36, relative to a horizontal plane 29, as indicated by arrow 129 in FIG. 1.

As shown, the riser post 110 has a curved upper surface indicated by reference 112 in FIG. 2. The tilt adjustment plate 120 is configured to sit on top of the curved surface 112 of the riser post 110, and with the curved surface the tilt adjustment plate 120 can be tilted fore and aft or positioned in a substantially horizontal position. To secure the tilt adjustment plate 120 and also fix the plate 120 in a tilted position or a horizontal position, the tilt adjustment plate 120 includes two bores holes 121, indicated individually by references 121a and 121b, for receiving respective riser bolt fasteners 122a and 122b. According to an exemplary implementation, the bore holes 121 have a chamfer and the bolt fasteners 122 have a corresponding tapered shoulder. The riser post 110 includes respective elongated openings 114a and 114b which are configured for receiving the bolt fasteners 122a and 122b. The bolt fasteners 122, and the tilt adjustment plate 120, are secured to the riser post 110 by respective barrel nuts 116, indicated individually by references 116a and 116b, which are inserted into respective bore holes 117a and 117b in the riser post 110 as shown in FIG. 2. Once the tilt adjustment plate 120 is positioned at the desired angle, the riser bolts 122 are tightened in the barrel nuts 116 and the plate 120 is pulled tight against the curved upper surface 112 of the riser post 110.

Figure 5A:
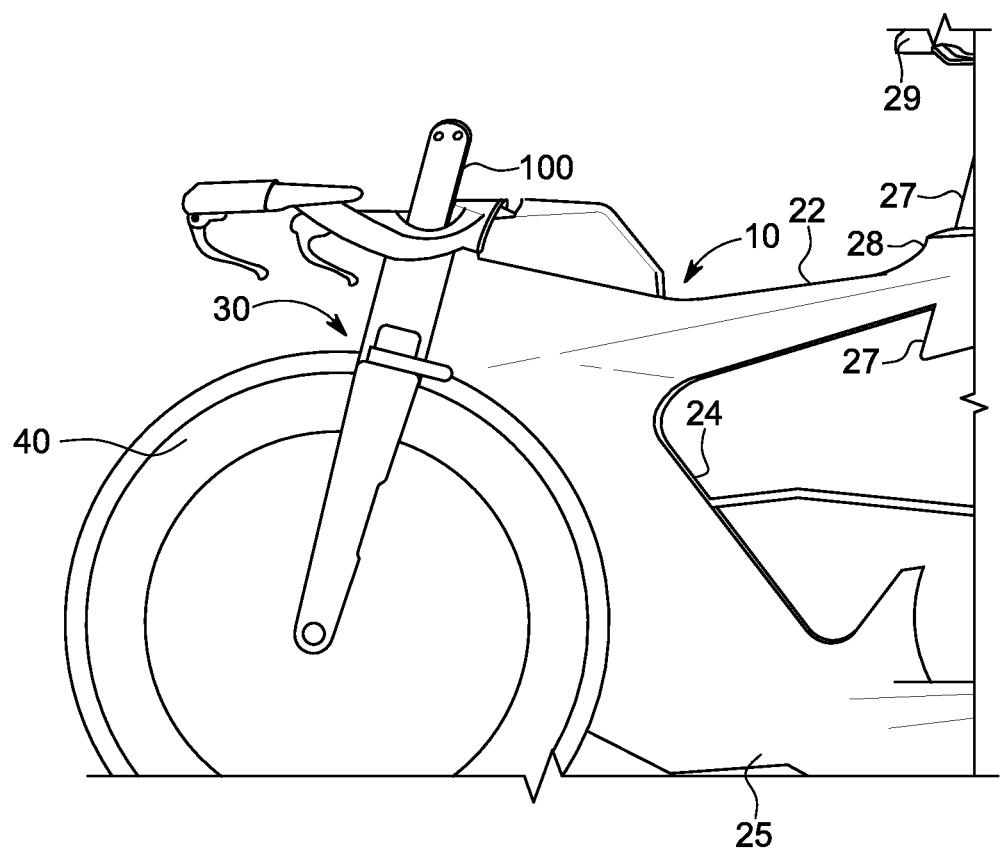
FIG. 5A shows a side view of an aerodynamic bicycle with the riser post configured in an extended position for the adjustable riser assembly of FIG. 2, according to an embodiment of the present invention.
Figure 5B:
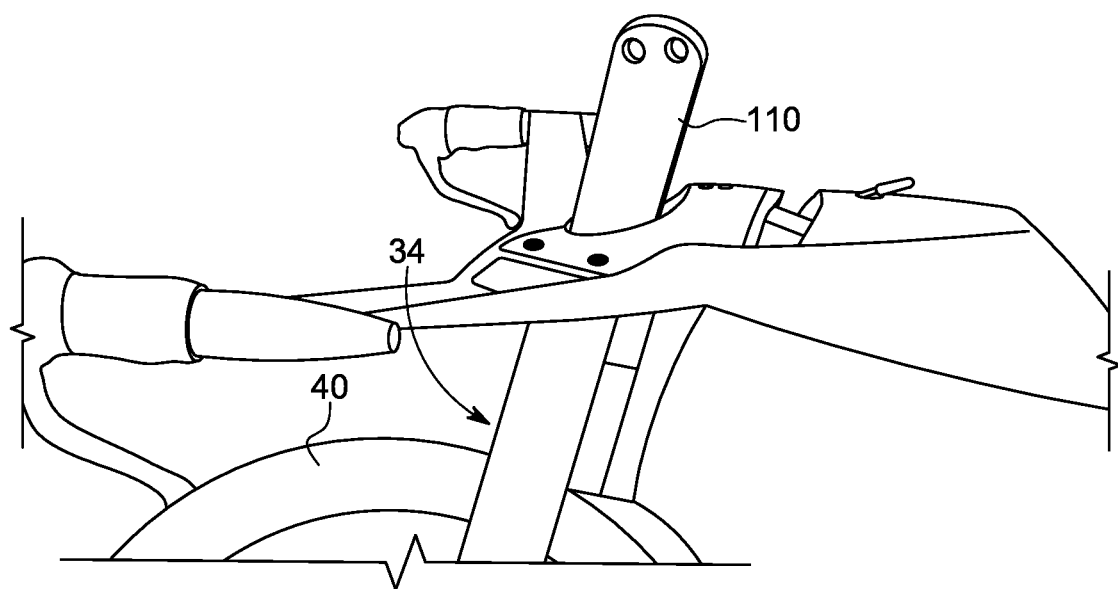
FIG. 5B shows a close-up side view of the aerodynamic bicycle of FIG. 5A with the riser post in an extended position.
Figure 5C:
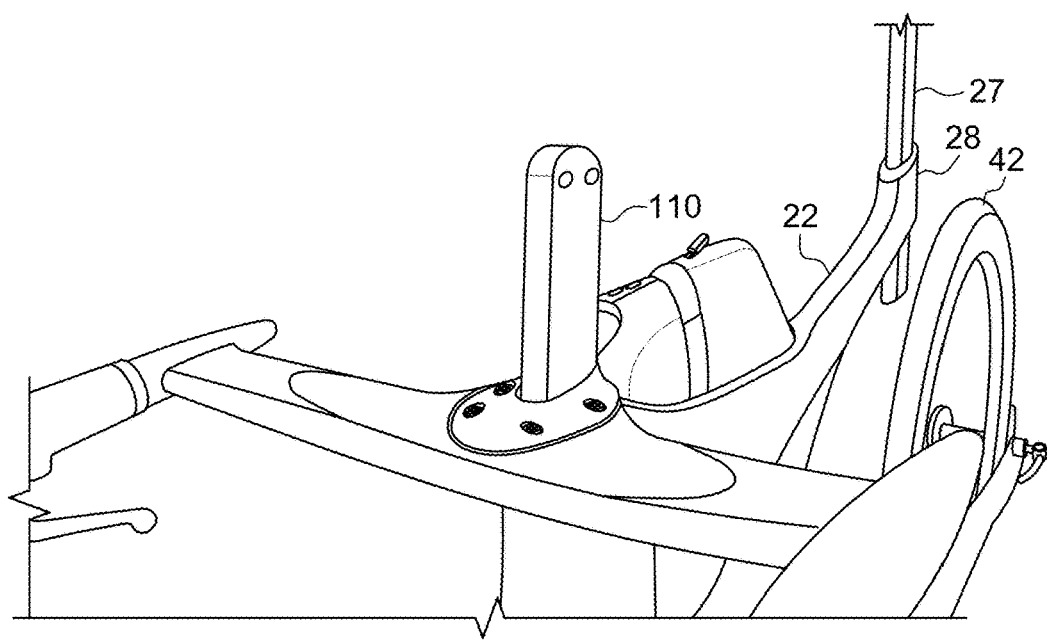
FIG. 5C shows a close-up left front view of the aerodynamic bicycle of FIG. 5A with the riser post in an extended position.
Figure 5D:
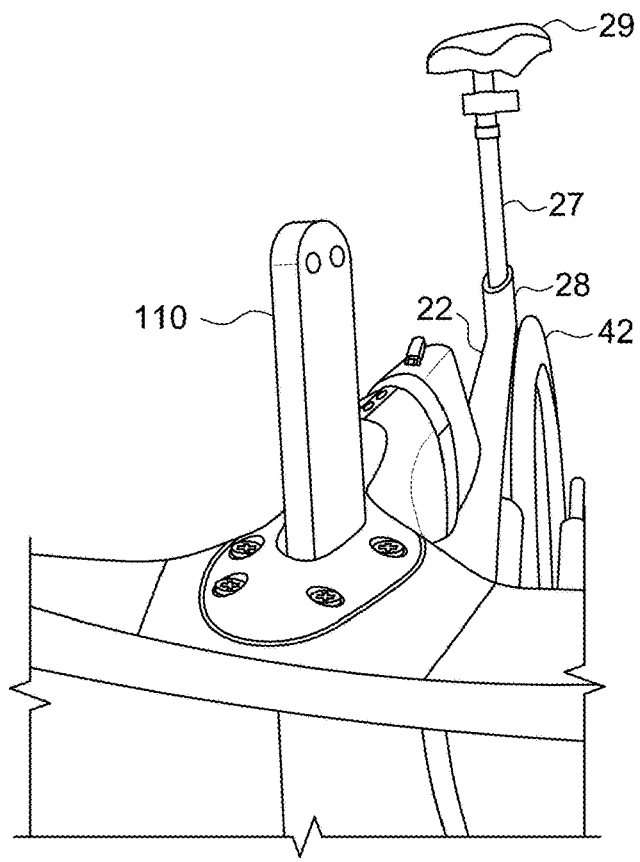
FIG. 5D shows a close-up left front view of the aerodynamic bicycle of FIG. 5A with the riser post in an extended position.

Reference is made to FIGS. 5A to 5D, which show an "aero" bike with the riser post 110 in an extended position for the adjustable riser assembly 100 according to an embodiment of the present invention. FIG. 5A shows a side-view the bicycle 10 with the riser post 110 in an extended position. FIG. 5B is a close-up side-view of the riser post 110 in the extended position. FIG. 5C shows a front side-view of the riser post 110 in the extended position. FIG. 5D is a close-up front side-view of the riser post 110 in the extended position.

Figure 3:
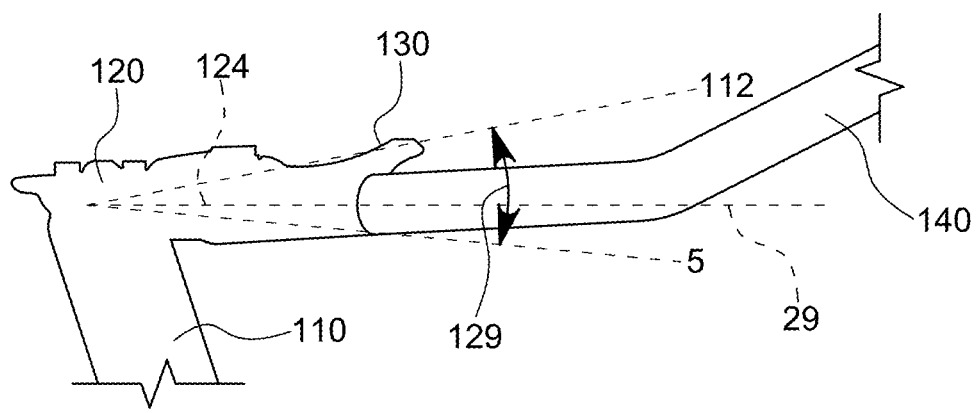
FIG. 3 is a side view of the adjustable riser assembly of FIG. 1 with the aerobar extension(s) mounted in the adjustable riser assembly.
Figure 4A:
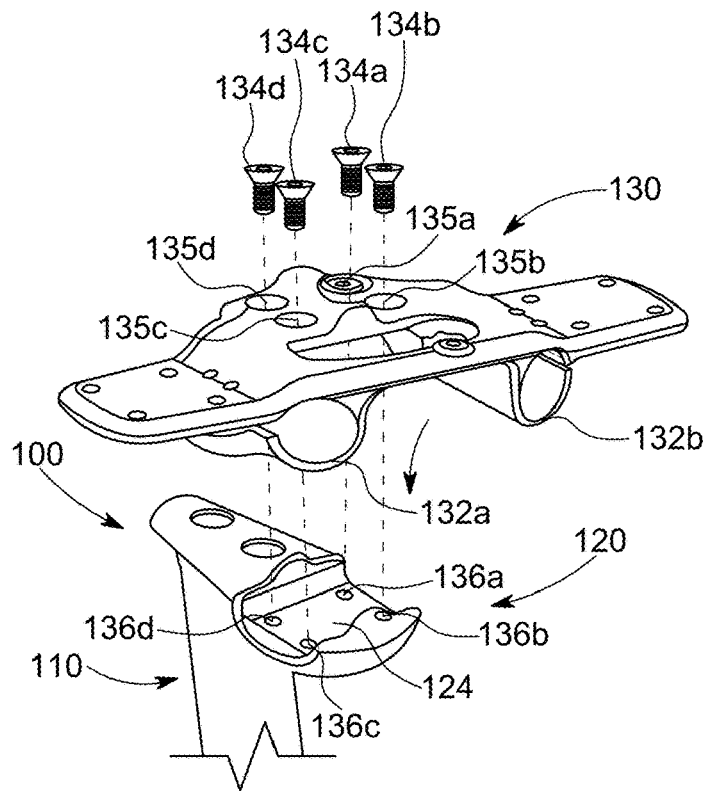
FIG. 4A shows an extension bar and pad mount assembly for mounting on the adjustable riser assembly.

Reference is next made to FIGS. 3 and 4, which show the tilt adjustment plate 120 secured to the riser post 110, and an extension bar and arm pad mount assembly 130 (FIG. 4) attached to the tilt adjustment plate 120. As shown in FIGS. 2 and 4, the tilt adjustment plate 120 includes a mounting slot and surface indicated generally by reference 124 for receiving and securing the extension bar and arm pad mount assembly 130. The extension bar and arm pad mount assembly 130 comprises a pair of extension bar mounting sockets 132, indicated by reference 132a and 132b, each configured to receive an extension bar 140, e.g. a multi-bend extension handle bar 140 as shown in FIG. 3. According to an exemplary implementation, the riser post 110 and the tilt plate 120 are configured to provide +12/−5 degree tilt adjustment as shown in FIG. 3.

As shown in FIG. 4, the extension bar and arm pad mount assembly 130 is secured to the mounting slot and surface 124 on the tilt adjustment plate 120 using mechanical fasteners, for instance, bolt fasteners or machine screws 134, indicated individually by references 134a, 134b, 134c and 134d. The extension bar and arm pad mount assembly 130 is configured with mounting holes, i.e. chamfered bored-through holes, 135, indicated individually by references 135a, 135b, 135c and 135d, for receiving the bolt fasteners 134 and securing the extension bar and arm pad mount assembly 130 to the tilt adjustment plate 120. As shown in FIG. 4, the mounting slot 124 includes threaded sockets 136, indicated individually by references 136a, 136b, 136c and 136d, for tightening and securing the extension bar and arm pad mount assembly 130. While described in the context machine screw fasteners and threaded sockets, it will be appreciated that other mechanical fasteners may also be utilized for securing the extension bar and arm pad mount assembly 130 to the tilt adjustment plate 120 and the riser post 110.

Figure 4B:
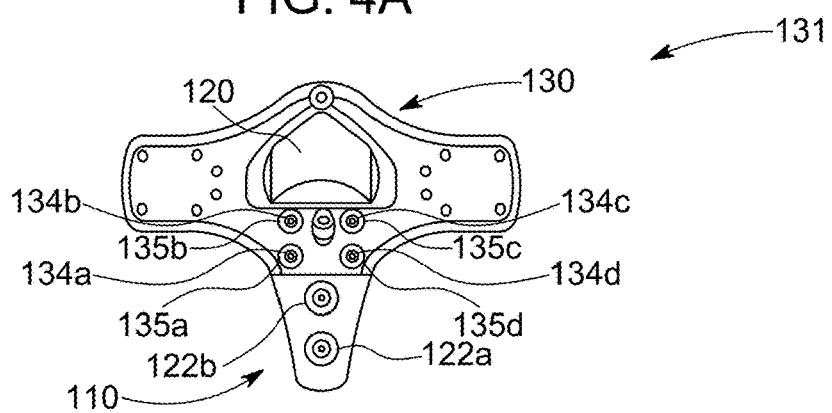
FIG. 4B shows an extension bar and pad mount assembly mounted on the adjustable riser assembly in a forward position according to an embodiment of the present invention.
Figure 4C:
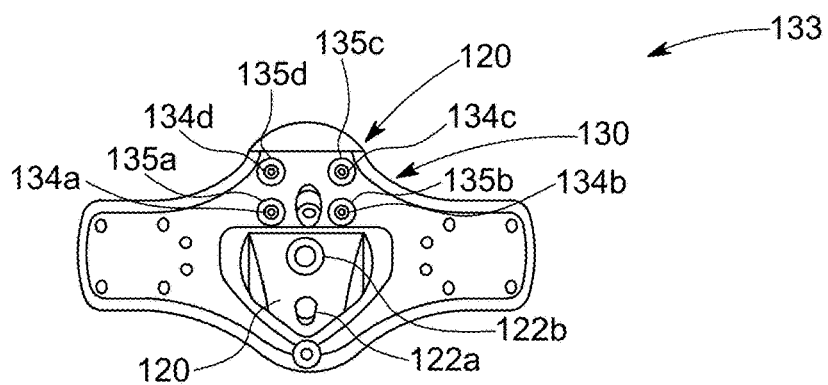
FIG. 4C shows an extension bar and pad mount assembly mounted on the adjustable riser assembly in a setback position according to an embodiment of the present invention.

According to another aspect, the tilt adjustment plate 120 is configured to mount the extension bar and arm pad mount assembly 130 in a forward position as shown and indicated generally by reference 131 in FIG. 4B, and also in a setback position as shown and indicated generally by reference 133 in FIG. 4C. According to an exemplary embodiment, the extension bar and arm pad mount assembly 130 comprises an asymmetric shape in relation to the mounting holes 135 as shown in FIG. 4B and FIG. 4C. In the forward mount position 131, the extension bar and arm pad mount assembly 130 is secured to the tilt adjustment plate 120 with the mounting holes at the rear, i.e. proximate the head tube. On the other hand, in the setback position 133, the extension bar and arm pad mount assembly 130 is flipped around, i.e. rotated 180°, and secured to the tilt adjustment plate 120 with the mounting holes at the front, i.e. away from the head tube, as shown in FIG. 4C. According to embodiment, extension bar mounting sockets 132 are provided on both sides of the extension bar and arm mount assembly 130. According to an exemplary implementation, the extension bar mounting sockets 132 may comprise a bore-through hole, or respective blind sockets which do not extend all the way through the extension bar assembly 120.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An adjustable riser assembly for a bicycle, said adjustable riser assembly comprising:
    a riser post;
    a tilt adjustment plate;
    said riser post including a curved mounting surface for receiving said tilt adjustment plate and said curved mounting surface being configured to support said tilt adjustment plate through a range of angular positions; and
    a fastener for securing said tilt adjustment plate to said riser post in said angular position;

wherein said tilt adjustment plate is configured with a mounting slot for affixing an extension bar assembly;

wherein said extension bar assembly comprises a forward position mounting configuration, and said mounting slot includes a plurality of sockets configured for receiving corresponding fasteners for securing said extension bar assembly in said mounting slot in said forward position; and wherein said extension bar assembly comprises a setback position mounting configuration, and said extension bar assembly is mounted in said setback position utilizing a plurality of fasteners secured in said plurality of sockets;

wherein said extension bar assembly includes first and second extension bar mounting sockets each configured for receiving an extension bar, and wherein said first and second extension bar mounting sockets extend through the extension bar assembly and are configured to mount respective extension bars in said forward position and in said setback position.

2. The adjustable riser assembly as claimed in claim 1, wherein said extension bar assembly comprises an asymmetric shape, with said forward position mounting configuration being defined by a first orientation of said asymmetric shape with respect to said tilt adjustment plate, and said setback position mounting configuration being defined by a second orientation of said asymmetric shape with respect to said tilt adjustment plate.

3. The adjustable riser assembly as claimed in claim 1, wherein the range of angular positions for setting said extension bar assembly is between approximately −5° to +12°.

4. The adjustable riser assembly as claimed in claim 1, wherein the riser post is adjustable in height, up and down, for raising or lowering the extension bar assembly.

5. The adjustable riser assembly as claimed in claim 1, the extension bar assembly further comprising an arm pad mount assembly, and wherein the arm pad mount assembly includes the extension bar mounting sockets.

6. An adjustable riser assembly for a bicycle, comprising:
a riser post configured to receive a tilt adjustment plate; and
an extension bar assembly configured to be attached to a surface of the tilt adjustment plate and secured with mechanical fasteners in a selected one of a plurality of angular positions and in either a forward position mounting configuration or a setback position mounting configuration;
wherein the extension bar assembly includes first and second extension bar mounting sockets each configured for receiving an extension bar, and wherein the first and second extension bar mounting sockets extend through the extension bar assembly and are configured to mount respective extension bars in the forward position or in the setback position; and
wherein the forward position mounting configuration is defined by a first orientation of the extension bar assembly with respect to the tilt adjustment plate, the setback position mounting configuration is defined by a second orientation of the extension bar assembly with respect to the tilt adjustment plate, and the second orientation is rotated by 180 degrees relative to the first orientation.

7. The adjustable riser assembly of claim 6, wherein the extension bar assembly includes an arm pad mount assembly, and the arm pad mount assembly includes the extension bar mounting sockets.

8. The adjustable riser assembly of claim 6, wherein the riser post is adjustable in height, up and down, for raising or lowering the extension bar assembly.

9. The adjustable riser assembly of claim 6, wherein the tilt adjustment plate is attachable to the riser post with two threaded fasteners configured to pass throug h corresponding apertures in the riser post at an angle corresponding to the selected angular position of the tilt adjustment plate.

10. The adjustable riser assembly of claim 6, wherein the plurality of angular positions includes an angular position of at least ten degrees relative to the horizontal plane.

11. An adjustable riser assembly for a bicycle, comprising:
a riser post configured to receive a tilt adjustment plate; and
an extension bar assembly configured to be attached to a surface of the tilt adjustment plate and secured with mechanical fasteners in a selected one of a plurality of angular positions relative to a horizontal plane;
wherein the extension bar assembly may be attached to the tilt adjustment plate in either a forward position mounting configuration or in a setback position mounting configuration;
wherein the extension bar assembly includes first and second extension bar mounting sockets each configured for receiving an extension bar, and wherein the first and second extension bar mounting sockets extend through the extension bar assembly and are configured to mount respective extension bars in the forward position or in the setback position; and
wherein the forward position mounting configuration is defined by a first orientation of the extension bar assembly with respect to the tilt adjustment plate, the setback position mounting configuration is defined by a second orientation of the extension bar assembly with respect to the tilt adjustment plate, and the second orientation is rotated by 180 degrees relative to the first orientation.

12. The adjustable riser assembly of claim 11, wherein the extension bar assembly includes an arm pad mount assembly, and the arm pad mount assembly includes the extension bar mounting sockets.

13. The adjustable riser assembly of claim 11, wherein the extension bar assembly has an asymmetric shape, with the forward position mounting configuration defined by a first orientation of the asymmetric shape with respect to the tilt adjustment plate, and the setback position mounting configuration defined by a second orientation of the asymmetric shape with respect to the tilt adjustment plate.

14. The adjustable riser assembly of claim 11, wherein the riser post is adjustable in height, up and down, for raising or lowering the extension bar assembly.

15. The adjustable riser assembly of claim 11, wherein the tilt adjustment plate is attachable to the riser post with two threaded fasteners configured to pass throug h corresponding apertures in the riser post at an angle corresponding to the selected angular position of the tilt adjustment plate.

16. The adjustable riser assembly of claim 11, wherein the plurality of angular positions includes an angular position of at least ten degrees relative to the horizontal plane.

* * * * *